April 24, 1956  F. CARTLIDGE  2,743,002
ARTICULATED CONVEYOR
Filed Dec. 6, 1951  3 Sheets-Sheet 1
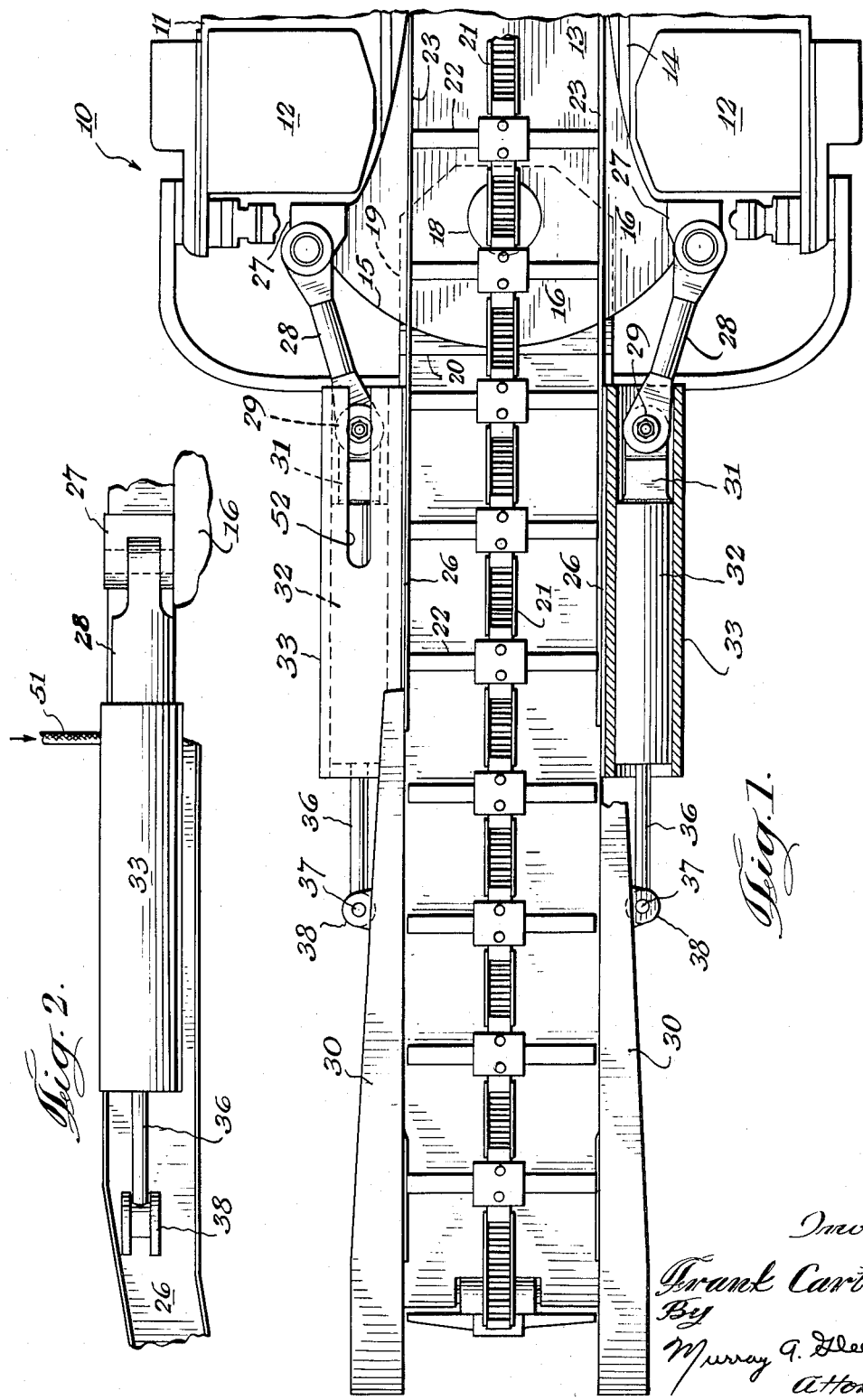
Inventor
Frank Cartlidge
By
Murray G. Gleeson
Attorney Inventor
Frank Cartlidge
By Murray G. Gleeson
Attorney April 24, 1956 — F. CARTLIDGE — 2,743,002
ARTICULATED CONVEYOR
Filed Dec. 6, 1951 — 3 Sheets-Sheet 3
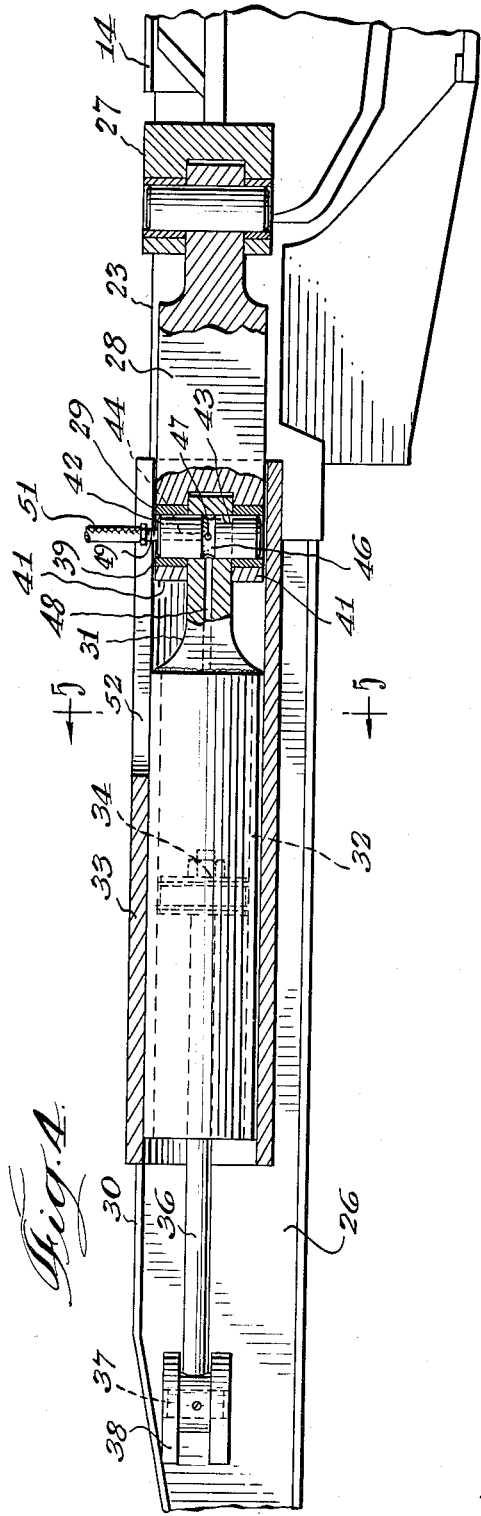
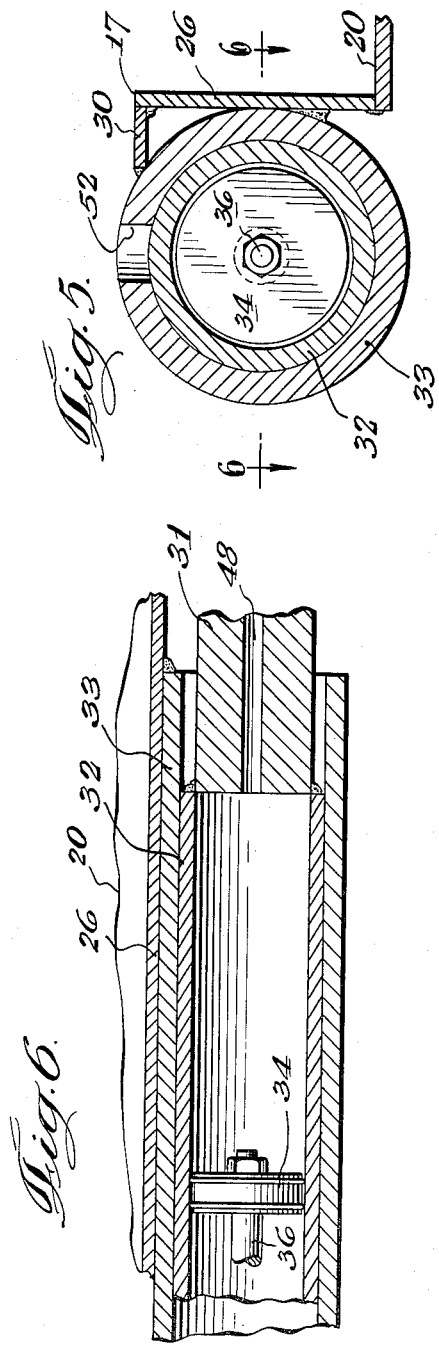
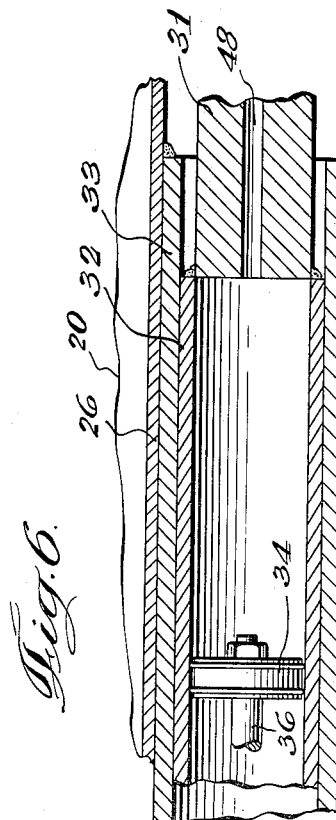
Inventor
Frank Cartlidge
By Murray G. Gleeson
Attorney

United States Patent Office 2,743,002
Patented Apr. 24, 1956

2,743,002

ARTICULATED CONVEYOR

Frank Cartlidge, Chicago, Ill., assignor to Goodman Manufacturing Company, Chicago, Ill., a corporation of Illinois Application December 6, 1951, Serial No. 260,283

7 Claims. (Cl. 198—109)

This invention relates generally to articulated conveyors and particularly to improvements in swinging and supporting the discharge trough section of the conveyor of a gathering and loading machine.

One of the principal objects of the invention is to provide an improved form of articulated flight conveyor such as is employed in a gathering and loading machine and characterized by a swingable discharge trough section having arms for supporting the weight of the discharge trough section, which load supporting arms also function directly with fluid pressure devices for swinging the discharge trough section.

Another object is to afford a combined load supporting and swinging means for the discharge trough section of a gathering and loading machine or the like, which enables the use of a simple pivot for the discharge trough section at the same time making it possible to lower the overall height of the machine.

Other objects and important features of the invention will become apparent from a study of the specification following taken with the drawings which together show a preferred embodiment of the invention and what is now considered to be the best mode of practicing the principles thereof. Other embodiments of the invention will be suggested to those having the benefits of the teachings herein and it is therefore intended that the invention not be limited by the precise embodiment herein shown nor otherwise than by the scope of the subjoined claims.

In the drawings:

Fig. 1 is a plan view of a gathering and loading machine having embodied therein the improvements according to the present invention;

Fig. 2 is a side view of a portion of the machine shown in Fig. 1;

Fig. 4 is a view similar to Fig. 2, certain parts thereof being shown in vertical section;

Fig. 5 is a vertical section taken along the line 5—5 of Fig. 4 looking in the direction of the arrows; and Fig. 6 is a horizontal section taken along the line 6—6 of Fig. 5 looking in the direction of the arrows.

Figure 3:
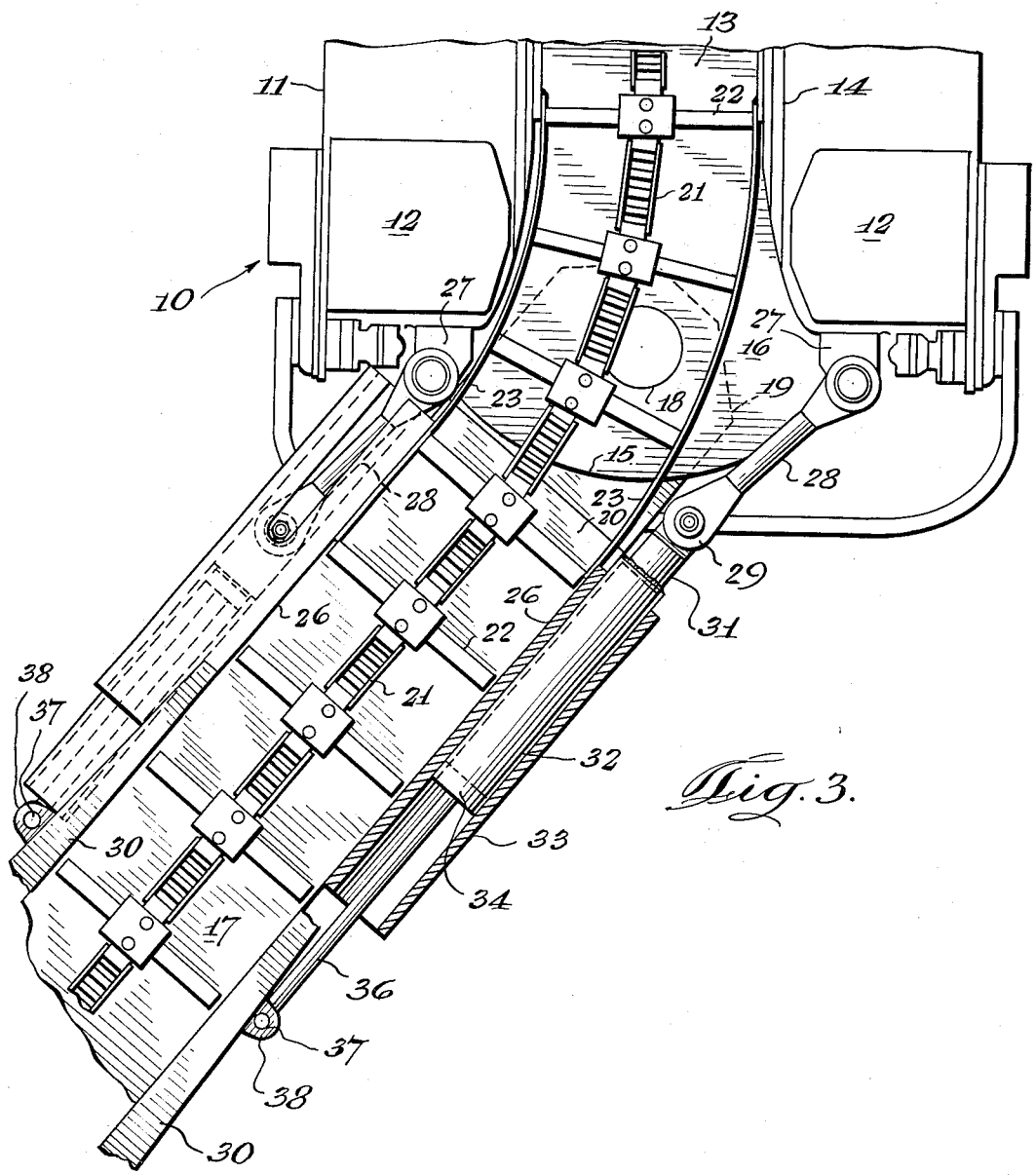
Fig. 3 is a view similar to Fig. 1 but showing the discharge trough section swung to one extreme position.

Referring now to the drawings, particularly Figs. 1 and 3 thereof, there is shown a gathering and loading machine 10 comprising a frame 11. The gathering and loading machine 10 is preferably mounted on crawler treads, not shown, and power to drive the machine is had by motors 12 mounted on each side of the frame 11.

The frame 11 includes a trough section 13 having trough side walls 14, the bottom of the trough section flaring as shown to provide a fish tail 16 having an arcuate edge 15. A discharge trough 17 is arranged to pivot in a substantially horizontal plane with respect to the trough section 13 about a pivot bearing 18, the discharge trough 17 including a bottom trough plate 19 which extends under the fish tail 16 and under bottom trough plate 20 and across the gap between the arcuate edge 15 of the fish plate 16 and the edge of the bottom trough plate 20 for all positions of the discharge trough 17 with respect to the trough section 13.

An endless chain conveyor 21 having flights 22 extends longitudinally of the trough sections 13 and 17, and in order to guide the ends of the flights 22 properly when the discharge trough 17 is swung with respect to the trough section 13, flexible spring steel side plates 23, 23 extend across the pivot bearing 18 on each side of the trough sections 13 and 17. The spring side plates 23 are anchored at 24, as by welding, to the sides 14 of the trough section 13, but are arranged to slide freely along vertical side walls 26 of the swingable trough section 17 as it is swung about the pivot bearing 18.

The trough section 13 is arranged to move in a vertical plane about a horizontal pivot, not shown, disposed on the frame 11. Lifting cylinders are disposed, and not shown, on each side of the trough section 13 for such purpose.

The fish plate 16 is stiffened throughout its length to provide support for the discharge trough section 17, and in order to support said discharge trough section without imposing lifting strains on the pivot bearing 18, each side of the fish plate 16 is provided with a knuckle member 27 to which is connected a knuckle arm 28. A knuckle joint 29 at the end of the knuckle arm 28 includes a knuckle finger 31 having welded thereto a cylinder 32 having bearing contact within and movable inside a load supporting sleeve or guide 33 which is welded alongside the outside of the vertical side walls 26 and to a horizontal flange 30 of the swingable trough section 17.

A piston 34 is slidable in the cylinder 32 and a piston rod 36 extends from the piston 34 and has a pinned connection 37 to an anchor member 38 welded or otherwise secured to the outside of the vertical side wall 26.

As seen more particularly in Fig. 4 the knuckle joint 29 provides means for applying fluid under pressure to the cylinder 32. The knuckle joint 29 thus includes bushings 39 held in clevis arms 41 of the knuckle arm 28, a pin 42 held in the bushings 39 and a reamed hole 43 in the end of the knuckle finger 31. The knuckle finger 31 is arranged to have a good sliding fit between the clevis arms 41 and to fit snugly on the pin 42.

An axial bore 44 is provided in the pin 42 and communicates with an annular passage 46 in the surface of the pin by radial passageways 47. A passageway 48 in the knuckle finger 31 intersects the annular passage 46, and a pressure fitting 49 and pressure line 51 connected to any convenient source of fluid under pressure thus provides the cylinder 32 with pressure fluid.

The dimensions of the knuckle finger 31 and the knuckle arm 28 are so chosen that they may enter the load supporting guide and sleeve 33 during articulation of the discharge trough section 17, as seen more particularly with reference to Figs. 3 and 4.

It will be apparent that when the piston 34 of one cylinder 32 is moving in a direction away from the knuckle finger 31 is entering the sleeve 32, a longitudinal and pressure line therefor must be ported to tank, when its piston is moving toward the cylinder head end of its associated cylinder.

In order to accommodate the pressure fitting 49 and its associated pressure line 51 during times when the knuckle finger 31 is entering the sleeve 32, a longitudinal slot 52 is milled through the thickness of the wall thereof.

It will be seen from the foregoing description that there has been provided a novel construction for swinging and supporting the discharge trough section of a gathering and loading machine. By the provision of the load supporting guides and the load supporting knuckle arms and fingers together with the fluid pressure cylinders combined support and swinging of the discharge trough section will be had without the necessity of providing a pivot for the discharge trough section required to take thrust occasioned by the weight of the discharge trough section. By the provision of the side mounted cylinders for swinging, a lower overall height for the machine is had. By enabling the knuckle arms and knuckle fingers to telescope into the load supporting guides greater angularity of swinging movement is also had.

While the invention has been described in terms of a preferred embodiment thereof its scope is not intended to be limited by the embodiment shown herein, and only by the scope and terms of the claims here appended.

I claim:

1. In an articulated conveyor for a gathering and loading machine or the like, a main frame, trough sections mounted on said main frame for an endless conveyor movable therealong, one of said trough sections being adapted to swing with respect to the other, means for swinging and supporting said swingable trough section comprising a load supporting sleeve mounted on a side of said swingable trough section, a cylinder movable therein, a load supporting arm having a knuckle joint connection with said cylinder at one end thereof and a knuckle joint connection at the other end thereof to said frame, said load supporting arm and said first named knuckle joint being of such dimension as to enter said load supporting sleeve upon swinging movement of said trough section, a piston movable in said cylinder and including a piston rod anchored to said swingable trough section, and means for supplying fluid under pressure to said cylinder to move said piston and cylinder relative to each other including a pressure connection to said knuckle joint and a pressure line connecting said knuckle joint to said cylinder, and a slot in said load supporting sleeve to accommodate said fluid supply means upon entrant movement of said load supporting arm into said load supporting sleeve.

2. In an articulated conveyor for a gathering and loading machine or the like, a main frame, trough sections mounted on said main frame for an endless conveyor movable therealong, one of said trough sections being adapted to swing with respect to the other, means for supporting and swinging said swingable trough section comprising a load supporting sleeve mounted on a side of said swingable trough section, a cylinder movable therein, a load supporting arm having a knuckle joint connection with said cylinder at one end thereof and a knuckle joint connection at the other end thereof to said frame, a piston movable in said cylinder and including a piston rod anchored to said swingable trough section, and means for supplying fluid under pressure to said cylinder to move said piston and cylinder relative to each other including a pressure connection to said knuckle joint and a pressure line connecting said knuckle joint to said cylinder.

3. In an articulated conveyor for a gathering and loading machine or the like, a main frame, trough sections mounted on said main frame for an endless conveyor movable therealong, one of said trough sections being adapted to swing with respect to the other, means for swinging and supporting said swingable trough section comprising a load supporting sleeve mounted on a side of said swingable trough section, a cylinder movable therein, a load supporting arm hingedly connected at one end to said cylinder and hingedly connected at the other end to said frame, said load supporting arm being of such dimension as to enter said load supporting sleeve upon swinging movement of said trough section, a piston movable in said cylinder and including a piston rod anchored to said swingable trough section, and means for supplying fluid under pressure to said cylinder to move said piston and cylinder relative to each other.

4. In an articulated conveyor for a gathering and loading machine or the like, a main frame, trough sections mounted on said main frame for an endless conveyor movable therealong, one of said trough sections being adapted to swing with respect to the other, means for swinging and supporting said swingable trough section comprising a load supporting sleeve mounted on a side of said swingable trough section, a cylinder movable therein, a load supporting arm hingedly connected at one end to said cylinder and at the other end to said frame, a piston movable in said cylinder and including a piston rod anchored to said swingable trough section, and means for supplying fluid under pressure to said cylinder to move said piston and cylinder relative to each other.

5. In an articulated conveyor for a gathering and loading machine or the like, a main frame, trough sections mounted on said main frame for an endless conveyor movable therealong, one of said trough sections being adapted to swing with respect to the other, means for supporting and swinging said swingable trough section comprising a load supporting guide mounted on a side of said swingable trough section, a cylinder movable therein, a load supporting arm hingedly connected at one end to said cylinder and hingedly connected at the other end to said frame, a piston movable with respect to said cylinder and including a piston rod anchored to said swingable trough section, and means for supplying fluid under pressure to said cylinder to move said piston and cylinder relative to each other for swinging movement of said swingable trough section.

6. In an articulated conveyor, a pair of conveyor sections which are pivotally connected to each other, one of said conveyor sections being movable with respect to the other, and means for swinging and supporting said movable section in such a manner as to maintain said pivotal connection free from thrusts incident to the weight of said movable conveyor section comprising a load supporting sleeve mounted on a side of said movable conveyor section, a cylinder movable therein, a load supporting arm hingedly connected at one end to said cylinder and at its other end to the fixed conveyor section, a piston movable in said cylinder and including a piston rod anchored to said movable conveyor section, and means for supplying fluid under pressure to said cylinder to move said piston and cylinder relative to each other.

7. In an articulated conveyor, a pair of conveyor sections which are pivotally connected to each other, one of said conveyor sections being movable with respect to the other, and means for swinging and supporting said movable section in such a manner as to maintain said pivotal connection free from thrusts incident to the weight of said movable conveyor section comprising a load supporting guide mounted on the side of said movable conveyor section, a cylinder movable therein, a load supporting arm hingedly connected at one end to said cylinder and hingedly connected at the other end to said other conveyor section, a piston movable with respect to said cylinder and including a piston rod anchored to said movable conveyor section, and means for supplying fluid under pressure to said cylinder to move said piston and cylinder relative to each other for movement of said movable conveyor section.

References Cited in the file of this patent

UNITED STATES PATENTS

| | | |
|---|---|---|
| 2,239,778 | Cartlidge | Apr. 29, 1941 |
| 2,353,052 | Levin | July 4, 1944 |
| 2,359,889 | Bigelow | Oct. 10, 1944 |